US010755017B2

(12) United States Patent
Anderson et al.

(10) Patent No.: US 10,755,017 B2
(45) Date of Patent: Aug. 25, 2020

(54) CELL PLACEMENT IN A CIRCUIT WITH SHARED INPUTS AND OUTPUTS

(71) Applicant: International Business Machines Corporation, Armonk, NY (US)

(72) Inventors: Brent A. Anderson, Jericho, VT (US); Laura R. Darden, Ridgedale, MO (US); Albert M. Chu, Nashua, NH (US); Alexander J. Suess, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 120 days.

(21) Appl. No.: 16/033,412

(22) Filed: Jul. 12, 2018

(65) Prior Publication Data

US 2020/0019665 A1    Jan. 16, 2020

(51) Int. Cl.
| | | |
|---|---|---|
| *G06F 17/50* | (2006.01) | |
| *G06F 30/392* | (2020.01) | |
| *H01L 27/02* | (2006.01) | |
| *H01L 27/118* | (2006.01) | |
| *G06F 30/327* | (2020.01) | |
| *G06F 30/398* | (2020.01) | |

(52) U.S. Cl.
CPC .......... *G06F 30/392* (2020.01); *G06F 30/327* (2020.01); *G06F 30/398* (2020.01); *H01L 27/0207* (2013.01); *H01L 27/11807* (2013.01)

(58) Field of Classification Search
None
See application file for complete search history.

(56) References Cited

U.S. PATENT DOCUMENTS

| | | | |
|---|---|---|---|
| 4,908,772 A | 3/1990 | Chi | |
| 5,313,079 A | 5/1994 | Brason et al. | |
| 5,625,568 A | 4/1997 | Edwards et al. | |
| 5,798,541 A * | 8/1998 | Jassowski | ........... H01L 27/0207 257/202 |
| 6,505,328 B1 | 1/2003 | Van Ginneken et al. | |
| 7,096,445 B1 * | 8/2006 | Pucci | .................. G06F 17/5068 716/119 |
| 7,200,827 B1 * | 4/2007 | Ku | ...................... G06F 17/5072 716/123 |
| 7,979,828 B2 | 7/2011 | Kuesel et al. | |
| 2007/0245280 A1 * | 10/2007 | Van Eijk | ............. G06F 17/5072 716/102 |

* cited by examiner

*Primary Examiner* — Leigh M Garbowski
(74) *Attorney, Agent, or Firm* — Cantor Colburn LLP; Vazken Alexanian

(57) ABSTRACT

A computer-implemented method of cell placement is provided. The method includes representing a non-rectangular cell to be placed into a cell row and searching the cell row to identify existing objects that are representative of cells in the cell row that are disposable to share space with the non-rectangular cell. The method further includes determining whether a representation of the non-rectangular cell is fittable into a modified mapping of the existing objects in the cell row and, in an event the representation is fittable into the modified mapping, overlapping the representation over one or more of the portions of the existing objects.

21 Claims, 7 Drawing Sheets

CELL PLACEMENT IN A CIRCUIT WITH SHARED INPUTS AND OUTPUTS

BACKGROUND

The present invention generally relates to the placement of cells in a circuit. More specifically, the present invention relates to a design methodology for cell placement in a circuit with shared inputs or outputs.

A typical standard cell outline has a rectangular shape. The rectangular cells are typically placed in a cell row. The cells can abut with each other on the cell row to minimize area. Currently, cell outlines are being redesigned and can have cell boundary shapes that are rectilinear polygons. For example, a cell boundary shape for one particular type of cell can be an "L" shape. This presents a challenge in achieving efficient cell placement that optimizes available area of a row.

SUMMARY

Embodiments of the present invention are directed to a computer-implemented method of cell placement is provided. A non-limiting embodiment of the method includes representing a non-rectangular cell to be placed into a cell row and searching the cell row to identify existing objects that are representative of cells in the cell row that are disposable to share space with the non-rectangular cell. The non-limited embodiment of the method further includes determining whether a representation of the non-rectangular cell is fittable into a modified mapping of the existing objects in the cell row and, in an event the representation is fittable into the modified mapping, overlapping the representation over one or more of the portions of the existing objects.

Embodiments of the present invention are directed to a method for placing a new cell into a cell row. A non-limiting example of the method includes mapping first objects representing first cells of the cell row, second objects with hidden objects representing second cells of the cell row and space of the second cells shareable with the new cell, respectively, and space available within the cell row. The method further includes determining whether a dummy object sized to encompass the new cell is fittable into a partial map of the cell row including the first objects, the second objects without the hidden objects and the space. The method also includes overlapping the dummy object with one of the hidden objects in an event the dummy object is fittable into the partial map.

Embodiments of the invention are directed to a method for placing a new cell into a cell row. A non-limiting example of the method includes generating a full map of the cell row including first objects representing first cells of the cell row, second objects with hidden objects representing second cells of the cell row and space of the second cells shareable with the new cell, respectively, and space available within the cell row. The method further includes determining whether a dummy object sized to encompass the new cell is fittable into a partial map of the cell row including the first objects, the second objects without the hidden objects and the space. The method also includes fitting the dummy object into the space in the full map by overlapping the dummy object with one of the hidden objects in an event the dummy object is fittable into the partial map.

Embodiments of the invention are directed to a method for placing a new non-rectangular cell into a cell row. A non-limiting example of the method includes generating a full map of the cell row including first rectangular objects representing rectangular cells of the cell row, second rectangular objects with hidden rectangular objects representing non-rectangular cells of the cell row and space of the non-rectangular cells shareable with the new non-rectangular cell, respectively, and space available within the cell row. The method further includes determining whether a rectangular dummy object sized to encompass the non-rectangular cell is fittable into a partial map of the cell row includes the first rectangular objects, the second rectangular objects without the hidden rectangular objects and the space. The method also includes fitting the rectangular dummy object into the space in the full map by overlapping the rectangular dummy object with one of the hidden rectangular objects in an event the rectangular dummy object is fittable into the partial map.

Embodiments of the invention are directed to a cell row. A non-limiting example of the cell row includes one or more rectangular cells, one or more non-rectangular cells and reserved space. The reserved space is between at least one of the one or more rectangular cells and at least one of the one or more non-rectangular cells. The reserved space is sized to accommodate a new cell having a shape which complements a shape of the at least one of the one or more non-rectangular cells.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
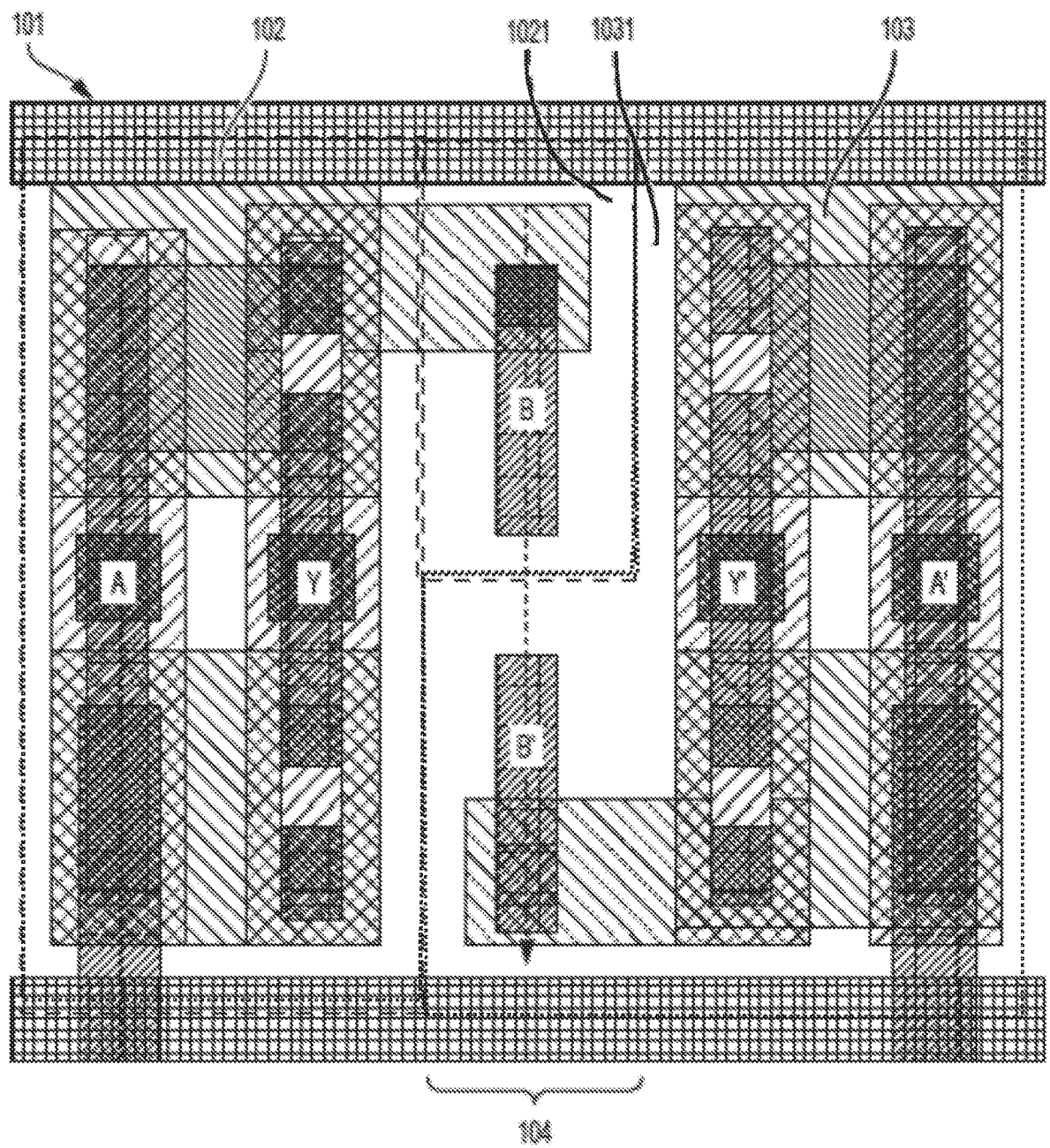
FIG. 1 depicts a portion of a cell row with interwoven cells placed adjacent to one another in accordance with embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the described embodiments, the various elements illustrated in the figures are provided with two or three digit reference numbers. With minor exceptions, the leftmost digit(s) of each reference number correspond to the figure in which its element is first illustrated.

DETAILED DESCRIPTION

For the sake of brevity, conventional techniques related to semiconductor device and integrated circuit (IC) fabrication may or may not be described in detail herein. Moreover, the various tasks and process steps described herein can be incorporated into a more comprehensive procedure or process having additional steps or functionality not described in detail herein. In particular, various steps in the manufacture of semiconductor devices and semiconductor-based ICs are well known and so, in the interest of brevity, many conventional steps will only be mentioned briefly herein or will be omitted entirely without providing the well-known process details.

Turning now to an overview of technologies that are more specifically relevant to aspects of the invention, digital logic circuits, also referred to as logic gates, are the building blocks of digital electronics and integrated circuits. A commonly used digital logic circuit is an inverter. Other fundamental logic circuits can include, among others, NAND and NOR circuits, wherein an accompanying number, such as the "3" in NAND3, can indicate the number of active gates in the logic circuit. Each of these logic circuits can perform a different logical operation. In a standard cell library, a number of transistors can be connected either in series and/or in parallel to perform NAND, NOR and other complex Boolean functions.

Complementary metal oxide semiconductor (CMOS) technology is currently the dominant technology for the manufacture of inverters and other logic gates used in digital integrated circuits, including microprocessors, microcontrollers, or static random access memory (SRAM). The word "complementary" refers to the fact that a typical CMOS circuit can use complementary pairs of hole-type (positive) and electron-type (negative) FETs (field effect transistors), i.e., p-FETs and n-FETs, respectively. The n-FET uses electrons as the current carriers in combination with n-doped source and drain junctions. The p-FET uses holes as the current carriers in combination with p-doped source and drain junctions. CMOS technology can offer low static power consumption and high noise immunity, when compared to other digital technologies.

An FET (also referred to as MOSFET) is a field effect transistor that can be used for amplifying or switching electronic signals. The MOSFET has a source, a drain, and a gate electrode. The gate electrode can include a conductive gate that is electrically insulated from the main semiconductor n-channel or p-channel by a thin layer of insulating material, for example, silicon dioxide, which makes the input resistance of the MOSFET relatively high. The gate voltage controls whether the path from drain to source is an open circuit ("off") or a resistive path ("on").

Vertical Transport FETs (VTFETs) are an alternative to standard lateral FET structures due to potential benefits, among others, in terms of reduced circuit footprint. In this type of structure, the current flow is perpendicular to a supporting wafer, unlike the lateral current flow in lateral FETs. A logic circuit including VTFETs can be referred to as a "vertical transport logic gate." In other words, VTFETs can potentially provide electronic devices that include logic circuits with improved circuit density. Such logic circuits can be characterized by a lower-number CPP (cell gate pitch) versus comparable logic circuits including lateral FET layouts. Minimum wiring pitch can also be relevant for realizing denser vertical FET layouts.

Although VTFETs are an alternative to conventional lateral FET structures for use in logic circuits, a challenge has been the circuit and layout-level implications of employing VTFETs in integrated circuits. In particular, to the extent that VTFETs can be provided in a series of cells within a cell row of a circuit layout, the cells should be arranged as close to one another as possible even where the cells have non-rectangular boundaries. In such cases, where the cells have boundaries that are rectilinear polygons, it is necessary to arrange the cells next to adjacent cells that have complementary shapes in order to achieve an efficient layout. However, it is often the case that cells need to be added to a cell row that already has a predefined layout and, in these instances, maintaining the efficiency of the layout while adding the cell into the cell row can be important.

Turning now to an overview of the aspects of the invention, one or more embodiments of the invention address the above-described shortcomings of the prior art by providing for a method of cell placement that includes representing a non-rectangular cell to be placed into a cell row as a dummy object and searching a full map of the cell row to identify existing objects that are representative of cells in the cell row that are disposable to share space with the non-rectangular cell. The method of cell placement further includes removing portions of the existing objects from the full map to generate a partial map and determining whether the dummy object is fittable into the partial map. In an event the dummy object is fittable into the partial map, the method of cell placement also includes overlapping the dummy object over one or more of the portions of the existing objects to fit the dummy object into the full map.

The above-described aspects of the invention address the shortcomings of the prior art by allowing for a non-rectangular cell to be placed into a cell row that has already been designed and laid out without sacrificing the overall efficiency of the design or the layout.

Turning now to a more detailed description of aspects of the present invention, FIG. 1 depicts a portion of a cell row 101 with interwoven cells 102 and 103 placed adjacent to one another in accordance with embodiments of the present invention. As shown in FIG. 1, cell 102 and cell 103 can each include one or more VTFETs (A and Y in cell 102 and A' and Y' in cell 103) or other similar electrical components as well as an input or an output element (B in cell 102 and B' in cell 103). Cells 102 and 103 also have non-rectangular boundaries 1021 and 1031, respectively, with each non-rectangular boundary 1021 and 1031 having a complementary "L" shape. As shown in FIG. 1, owing to the complementary "L" shapes of the cell boundaries 1021 and 1031 of cells 102 and 103, respectively, the cells 102 and 103 can be placed in close abutment with each other whereby they effectively share space 104.

Figure 2:
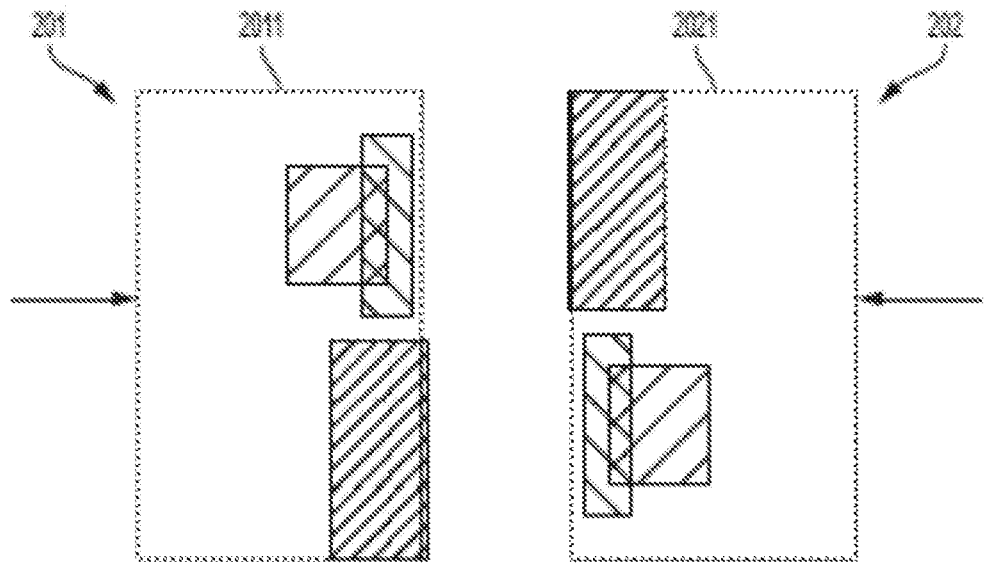
FIG. 2 is a schematic illustration of non-rectangular cells that have complementary shapes in accordance with embodiments of the present invention.
Figure 3:
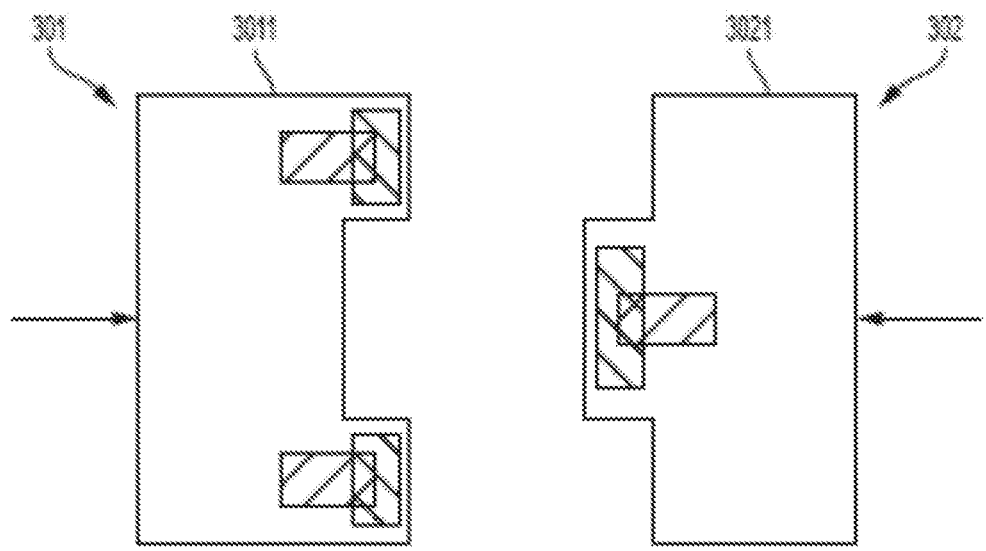
FIG. 3 is a schematic illustration of non-rectangular cells that have complementary shapes in accordance with embodiments of the present invention.

With reference to FIGS. 2 and 3, cell boundaries of various types of cells can have various shapes. For example, as shown in FIG. 2, the cells 201 and 202 have "L" shaped cell boundaries 2011 and 2021 similar to the cell boundaries 1021 and 1031 of FIG. 1. The cells 201 and 202 can therefore be placed in a cell row in close abutment with each other in order to make an efficient use of the available space in the cell row. As another example, as shown in FIG. 3, the cells 301 and 302 have "female" and "male" shaped cell boundaries 3011 and 3021. Thus, once again, the cells 301 and 302 can be placed in a cell row in close abutment with each other in order to make an efficient use of the available space in the cell row.

The following descriptions will now relate to various methods of cell placements into a cell row. The methods can generally be conducted and completed by a computer or an automated system that includes among other features an internal placement engine. The internal placement engine may be embodied in hardware, software and firmware that is local to or remote from the computer or the automated system. In any case, the internal placement engine is configured to generate a placement map, which is a representation of all objects and blockages within a given design of, for example, an IC or a portion thereof. A full map can be derived from the placement map by treating all standard and non-standard cells within the design as full rectangles. A partial map can be derived from the full map by removing left or right extensions from the representative full rectangles of the full map for those cells (i.e., the non-standard cells) which have non-standard shapes, such as those described above with respect to FIGS. 1, 2 and 3.

Figure 4:
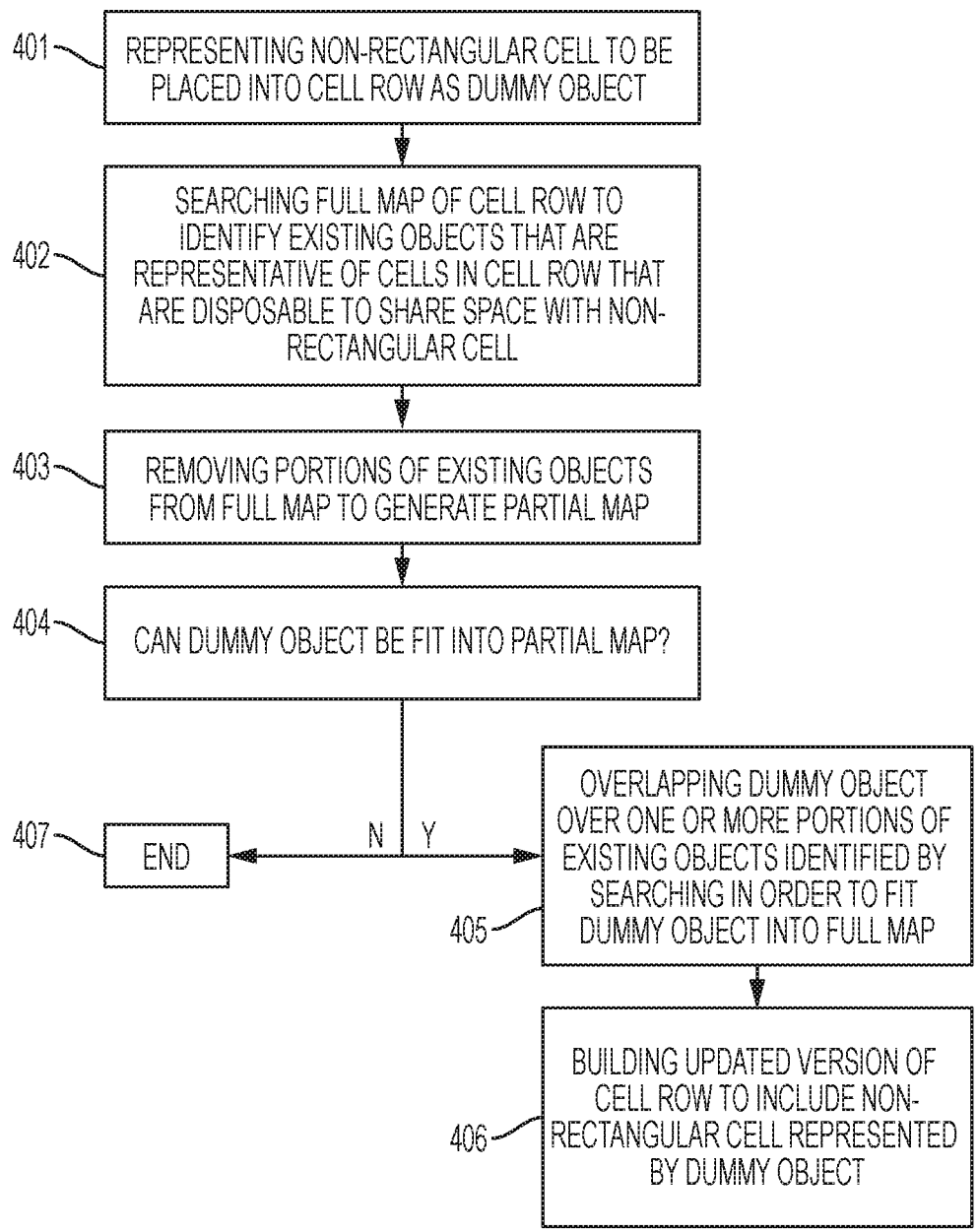
FIG. 4 is a flow diagram illustrating a method of cell placement in accordance with embodiments of the present invention.

With reference to FIG. 4, a method of cell placement in accordance with embodiments of the present invention is provided to facilitate the placement of a cell, such as a non-rectangular cell, into a cell row that is previously designed and possibly built. As shown in FIG. 4, the method includes representing a non-rectangular cell to be placed into a cell row as a dummy object (401) and searching the full map of the cell row to identify existing objects that are representative of cells in the cell row that are disposable to share space with the non-rectangular cell (402). That is, the method includes a search of those portions of the cell row that have shapes which complement the shape of the non-rectangular cell and thus can be interwoven with the non-rectangular cell. The method further includes removing portions of the existing objects from the full map (by, for example, carving off the left or right extensions from the existing objects that are representative of cells in the cell row that are disposable to share space with the non-rectangular cell) to generate the partial map (403) and determining whether the partial map has sufficient space available for the dummy object, which is representative of the non-rectangular cell, and thus whether the dummy object can be fit into the partial map (404). In an event the dummy object can indeed be fit into the partial map, the method also includes overlapping the dummy object over one or more of the portions of the existing objects that are identified by the searching in order to fit the dummy object into the full map (405). Once the dummy object is fit into the full map, the method can include building an updated version of the cell row to include the non-rectangular cell represented by the dummy object (406). Here, the non-rectangular cell is built into the cell row in a manner whereby the non-rectangular cell is interwoven with those portions of the existing objects in the cell row that complement the shape of the non-rectangular cell. In an event the dummy object cannot be fit into the partial map, the method is discontinued (407).

Figure 5:
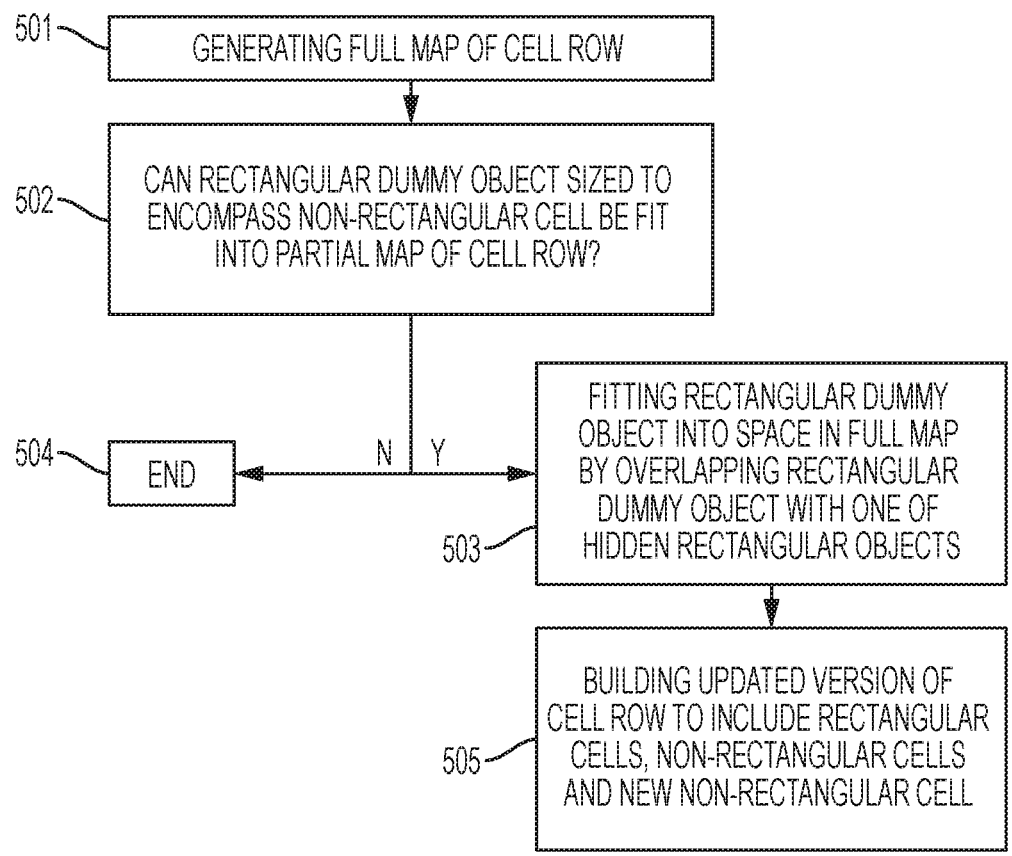
FIG. 5 is a flow diagram illustrating a method for placing a new non-rectangular cell into a cell row in accordance with embodiments of the present invention.

With reference to FIG. 5, a method for placing a new non-rectangular cell into a cell row in accordance with embodiments of the present invention is provided. As shown in FIG. 5, the method includes generating the full map of the cell row (501) where the full map includes first rectangular objects representing rectangular cells of the cell row, second rectangular objects with hidden rectangular objects representing non-rectangular cells of the cell row and space of the non-rectangular cells shareable with the new non-rectangular cell, respectively, and space available within the cell row. The method further includes determining whether a rectangular dummy object sized to encompass the non-rectangular cell can be fit into the partial map of the cell row (502) where the partial map includes the first rectangular objects, the second rectangular objects but without the hidden rectangular objects and the space. The method also include fitting the rectangular dummy object into the space in the full map by overlapping the rectangular dummy object with one of the hidden rectangular objects in an event the rectangular dummy object is fittable into the partial map (503) or discontinuing in an event the rectangular dummy object is not fittable into the partial map (504). Once the rectangular dummy object is fit into the space in the full map in operation 503, the method can also include building an updated version of the cell row to include the rectangular cells, the non-rectangular cells and the new non-rectangular cell (505).

With reference to FIGS. 6-9, the method for placing the new non-rectangular cell into the cell row described above is illustrated in graphical detail. The cell row generally includes a series of cells that have rectangular cell boundaries and can be represented as first rectangular objects, cells that have non-rectangular (or rectilinear polygonal) cell boundaries and can be represented as second rectangular objects with hidden rectangular objects and space between the rectangular and non-rectangular cells.

Figure 6:
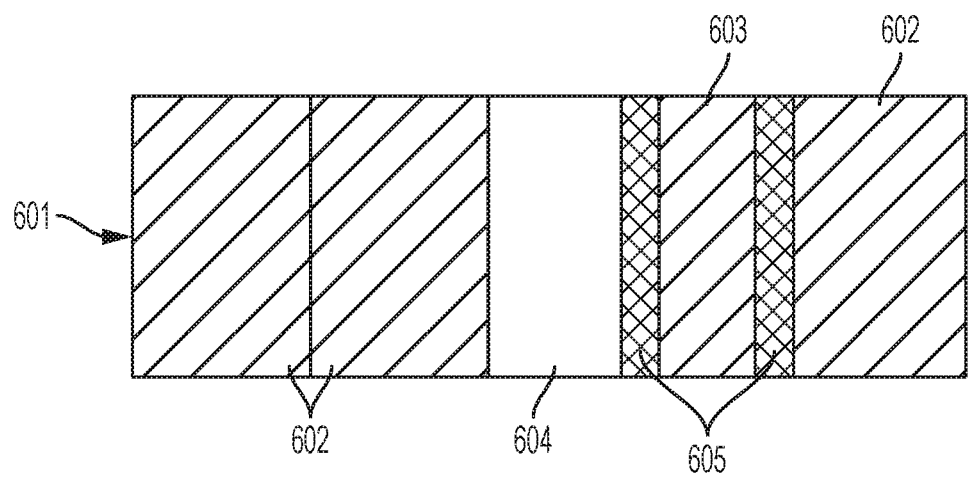
FIG. 6 is a full map of a cell row in accordance with embodiments of the present invention.

As shown in FIG. 6, the method initially includes generating a full map 601 of the cell row into which the new non-rectangular cell is to be placed. The full map 601 includes first rectangular objects 602, which represent rectangular cells of the cell row, second rectangular objects 603 and space 604 that is available within the cell row. The second rectangular objects 603 have with hidden rectangular objects 605. The second rectangular objects 603 represent non-rectangular cells of the cell row. The hidden rectangular objects 605 represent sections, portions or spaces of the non-rectangular cells that is or are shareable with the new non-rectangular cell.

Because the shape of the non-rectangular cells of the cell row can vary (see FIGS. 2 and 3 for examples of cell boundary shapes), the generating of the full map 601 can include illustrating the hidden rectangular objects 605 differently for different shapes the second rectangular objects 603 can have. For example, in an event one second rectangular object 603 has opposite sides that complement an "L" shaped new non-rectangular cell while another second rectangular object 603 has opposite "male" shaped sides for engagement with "female" shaped new non-rectangular objects, the hidden rectangular objects 605 for each of the second rectangular object 603 would be presented differently.

Figure 7:
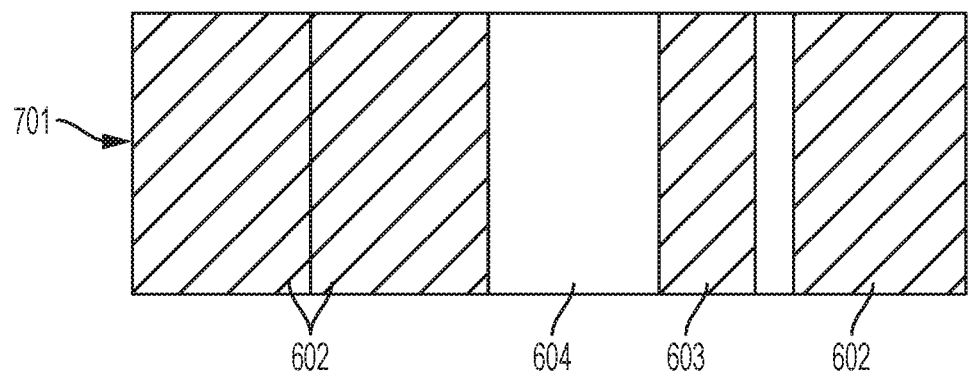
FIG. 7 is a partial map of the cell row of FIG. 4 in accordance with embodiments of the present invention.

As shown in FIG. 7, a next operation in the method includes the generating of a partial map 701 of the cell row. The partial map 701 includes the first rectangular objects 602, the second rectangular objects 603 and the space 604 but does not include the hidden rectangular objects 605. The partial map 701 thus provides an illustration and an indication of the available space in the cell row in which the new non-rectangular cell would be placed if there is sufficient space available to do so.

Figure 8:
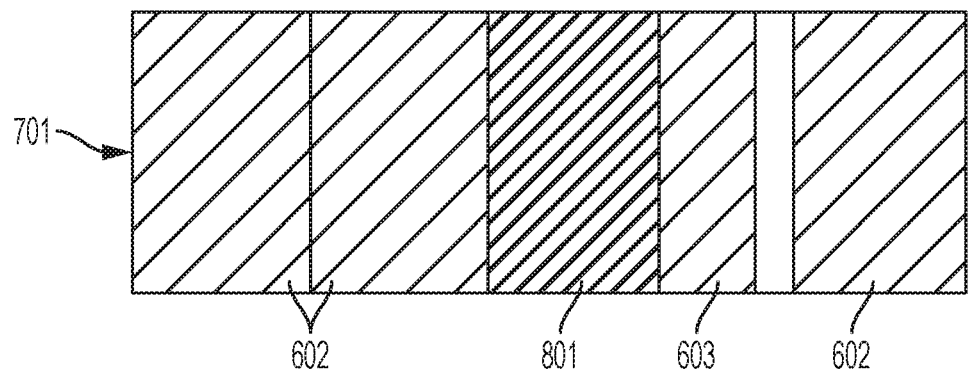
FIG. 8 depicts a dummy object being fit into the partial map of FIG. 5 in accordance with embodiments of the present invention.

At this point, as shown in FIG. 8, the method includes providing a rectangular dummy object 801 that is sized to encompass the new non-rectangular cell and determining whether the rectangular dummy object 801 is fittable into the partial map 701 of the cell row. The rectangular dummy object 801 has a height that exceeds a maximum height of the new non-rectangular cell and a width that exceeds a maximum width of the new non-rectangular cell. As such, if the rectangular dummy object 801 can be fit into the available of the partial map 701, it can be seen that the new non-rectangular cell can be fit into the cell row.

Figure 9:
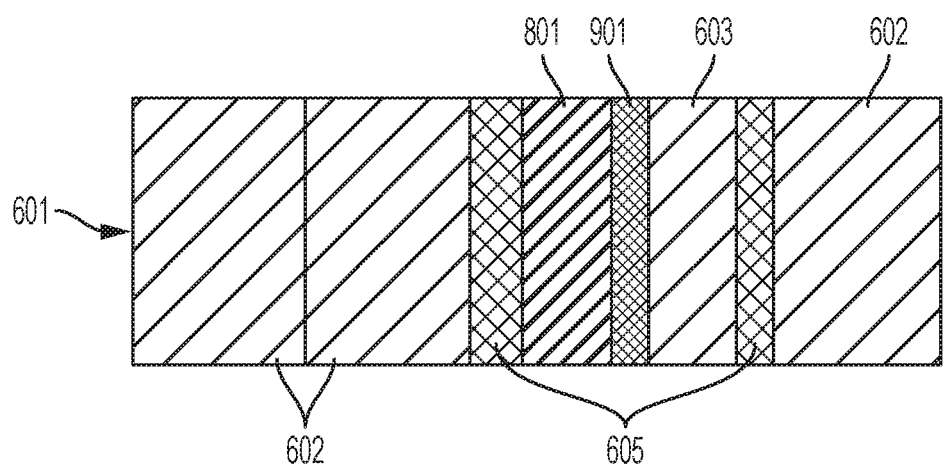
FIG. 9 is a full map of the cell row of FIGS. 4-6 with the dummy object in accordance with embodiments of the present invention.

As shown in FIG. 9, the method also includes fitting the rectangular dummy object 801 into the space 604 (see FIG. 6) of the full map 601 by overlapping the rectangular dummy object 801 with one or more of the hidden rectangular objects 605 in an event the rectangular dummy object 801 is determined to be fittable into the partial map 801. The overlapping is representative of the new non-rectangular cell effectively sharing space with the one or more non-rectangular cells that have complementary shapes. At this point, the full map 601 includes the first rectangular objects 602, the second rectangular objects 603 with the hidden rectangular objects 605 and the rectangular dummy object 801 with additional hidden rectangular objects 901. The additional hidden rectangular objects 901 represent spaces of the new non-rectangular cell that are shared with the respective spaces of the one or more non-rectangular cells respectively associated with the one or more of the hidden rectangular objects 605.

Once the full map 601 is updated, an updated version of the cell row can be built according to the spatial relationships of the updated full map 601 to include the rectangular cells, the non-rectangular cells and the new non-rectangular cell.

Figure 10:
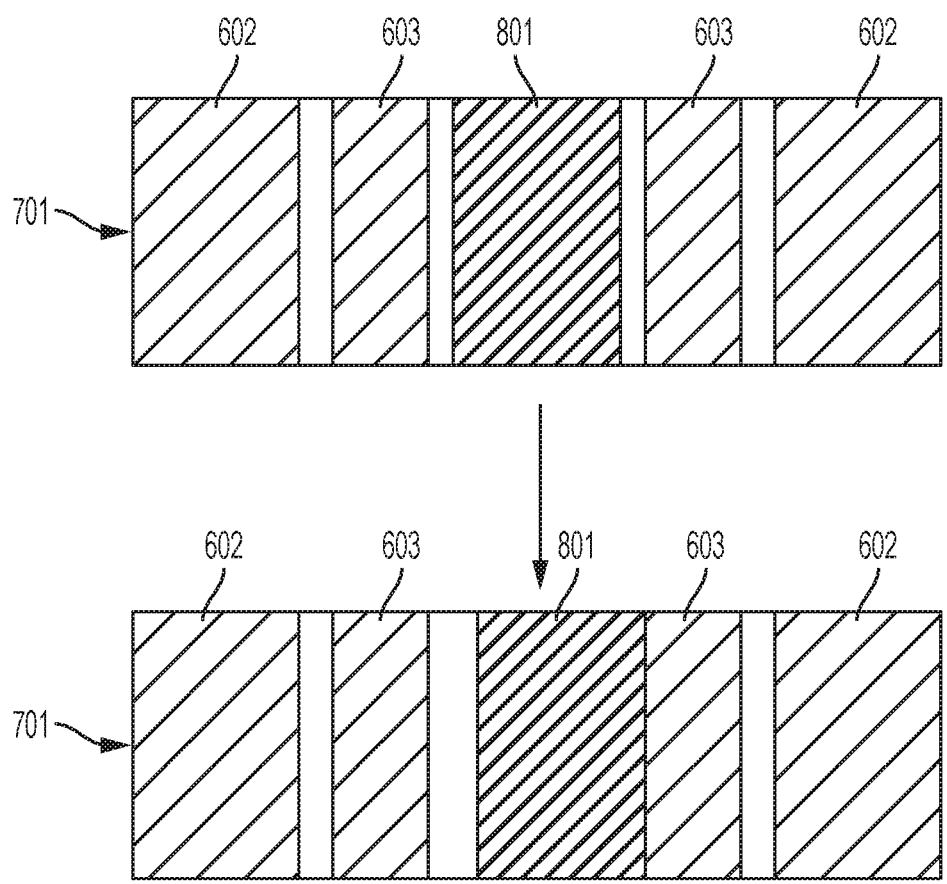
FIG. 10 depicts a dummy object being fit into a partial map so that it abuts another object in accordance with embodiments of the present invention.

With reference to FIG. 10, the determining of whether the rectangular dummy object 801 is fittable into the partial map 701 of the cell row can indicate that there is only just enough space for the rectangular dummy object 602 in the partial map 701 or that there is an excess amount of space available. In the latter case, the determining can include forcing an abutment between the rectangular dummy object 602 and one of the second rectangular objects 603 (i.e., during the determining of whether the dummy object can be fit into the partial map of operation 404 of FIG. 4 or the during the fitting of the rectangular dummy object into the space in the full map of operation 503 of FIG. 5).

Figure 11:
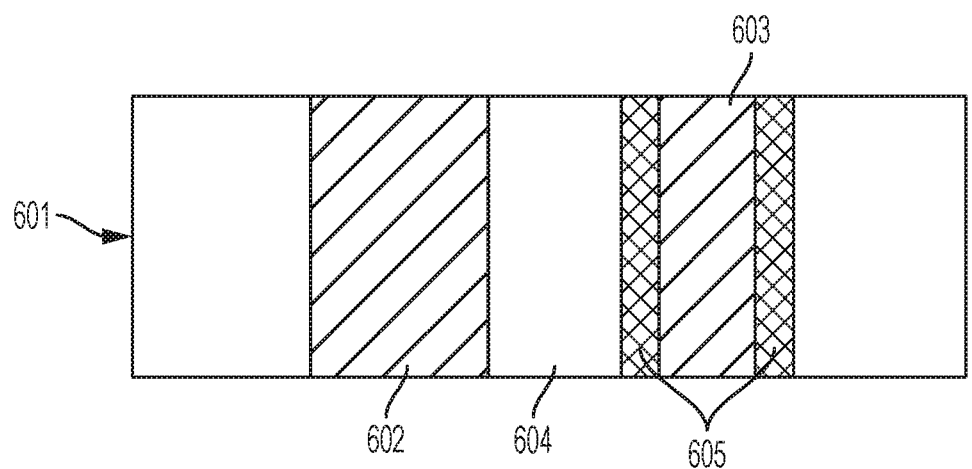
FIG. 11 depicts a cell row with reserved space in accordance with embodiments of the present invention.

With reference to FIG. 11, the method can include building the cell row such that the space 604 of the full map 601 is disposed adjacent to the second rectangular objects 603 with the hidden rectangular objects 605. Thus, the space 604 is effectively provided as a reserved space in anticipation for a new non-rectangular cell being placed therein.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

Spatially relative terms, e.g., "beneath," "below," "lower," "above," "upper," and the like, can be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device can be otherwise oriented (rotated 90 degrees or at other orientations) and the spatially relative descriptors used herein interpreted accordingly.

The phrase "selective to," such as, for example, "a first element selective to a second element," means that the first element can be etched and the second element can act as an etch stop.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The term "conformal" (e.g., a conformal layer) means that the thickness of the layer is substantially the same on all surfaces, or that the thickness variation is less than 15% of the nominal thickness of the layer.

The terms "epitaxial growth and/or deposition" and "epitaxially formed and/or grown" mean the growth of a semiconductor material (crystalline material) on a deposition surface of another semiconductor material (crystalline material), in which the semiconductor material being grown (crystalline overlayer) has substantially the same crystalline characteristics as the semiconductor material of the deposition surface (seed material). In an epitaxial deposition process, the chemical reactants provided by the source gases can be controlled and the system parameters can be set so that the depositing atoms arrive at the deposition surface of the semiconductor substrate with sufficient energy to move about on the surface such that the depositing atoms orient themselves to the crystal arrangement of the atoms of the deposition surface. An epitaxially grown semiconductor material can have substantially the same crystalline characteristics as the deposition surface on which the epitaxially grown material is formed. For example, an epitaxially grown semiconductor material deposited on a {100} orientated crystalline surface can take on a {100} orientation. In some embodiments of the invention, epitaxial growth and/or deposition processes can be selective to forming on semiconductor surface, and cannot deposit material on exposed surfaces, such as silicon dioxide or silicon nitride surfaces.

As previously noted herein, for the sake of brevity, conventional techniques related to semiconductor device and integrated circuit (IC) fabrication may or may not be described in detail herein. By way of background, however, a more general description of the semiconductor device fabrication processes that can be utilized in implementing one or more embodiments of the present invention will now be provided. Although specific fabrication operations used in implementing one or more embodiments of the present invention can be individually known, the described combination of operations and/or resulting structures of the present invention are unique. Thus, the unique combination of the operations described in connection with the fabrication of a semiconductor device according to the present invention utilize a variety of individually known physical and chemical processes performed on a semiconductor (e.g., silicon) substrate, some of which are described in the immediately following paragraphs.

In general, the various processes used to form a microchip that will be packaged into an IC fall into four general categories, namely, film deposition, removal/etching, semiconductor doping and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal/etching is any process that removes material from the wafer. Examples include etch processes (either wet or dry), and chemical-mechanical planarization (CMP), and the like. Semiconductor doping is the modification of electrical properties by doping, for example, transistor sources and drains, generally by diffusion and/or by ion implantation. These doping processes are followed by furnace annealing or by rapid thermal annealing (RTA). Annealing serves to activate the implanted dopants. Films of both conductors (e.g., poly-silicon, aluminum, copper, etc.) and insulators (e.g., various forms of silicon dioxide, silicon nitride, etc.) are used to connect and isolate transistors and their components. Selective doping of various regions of the semiconductor substrate allows the conductivity of the substrate to be changed with the application of voltage. By creating structures of these various components, millions of transistors can be built and wired together to form the complex circuitry of a modern microelectronic device. Semiconductor lithography is the formation of three-dimensional relief images or patterns on the semiconductor substrate for subsequent transfer of the pattern to the substrate. In semiconductor lithography, the patterns are formed by a light sensitive polymer called a photo-resist. To build the complex structures that make up a transistor and the many wires that connect the millions of transistors of a circuit, lithography and etch pattern transfer steps are repeated multiple times. Each pattern being printed on the wafer is aligned to the previously formed patterns and slowly the conductors, insulators and selectively doped regions are built up to form the final device.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for placing a new cell into a cell row, the method comprising:
   mapping first objects representing first cells of the cell row, second objects with hidden objects representing second cells of the cell row and space of the second cells shareable with the new cell, respectively, and space available within the cell row; and determining whether a dummy object sized to encompass the new cell is fittable into a partial map of the cell row comprising the first objects, the second objects without the hidden objects and the space; and overlapping the dummy object with one of the hidden objects in an event the dummy object is fittable into the partial map.

2. The computer-implemented method according to claim 1, further comprising building an updated version of the cell row to comprise the first cells, the second cells and the new cell.

3. The computer-implemented method according to claim 1, further comprising re-mapping the first objects, the second objects with the hidden objects and the dummy object with additional hidden objects following the overlapping, the additional hidden objects representing space of the new cell shared with the space of the second cell associated with the one of the hidden objects.

4. The computer-implemented method according to claim 1, wherein the determining comprises forcing an abutment between the dummy object and one of the second objects.

5. The computer-implemented method according to claim 1, wherein the fitting comprises fitting the dummy object into the space in the full map by overlapping the dummy object with one or more of the hidden objects in an event the dummy object is fittable into the partial map.

6. The computer-implemented method according to claim 5 further comprising re-mapping the first objects, the second objects with the hidden objects and the dummy object with additional hidden objects;

where the additional hidden objects represent spaces of the new cell shared with the respective spaces of the one or more second cells respectively associated with the one or more of the hidden objects.

7. The computer-implemented method according to claim 1 further comprising building the cell row such that the space of the full map is disposed adjacent to the second objects with the hidden objects.

8. A computer-implemented method for placing a new cell into a cell row, the method comprising:

generating a full map of the cell row comprising:
first objects representing first cells of the cell row;
second objects with hidden objects representing second cells of the cell row and space of the second cells shareable with the new cell, respectively; and
space available within the cell row; and
determining whether a dummy object sized to encompass the new cell is fittable into a partial map of the cell row comprising:
the first objects;
the second objects without the hidden objects; and
the space; and
fitting the dummy object into the space in the full map by overlapping the dummy object with one of the hidden objects in an event the dummy object is fittable into the partial map.

9. The computer-implemented method according to claim 8 further comprising building an updated version of the cell row to comprise the first cells, the second cells and the new cell.

10. The computer-implemented method according to claim 8, wherein, following the fitting, the full map comprises:
the first objects;
the second objects with the hidden objects; and
the dummy object with additional hidden objects,
the additional hidden objects representing space of the new cell shared with the space of the second cell associated with the one of the hidden objects.

11. The computer-implemented method according to claim 8, wherein the determining comprises forcing an abutment between the dummy object and one of the second objects.

12. The computer-implemented method according to claim 8, wherein the fitting comprises fitting the dummy object into the space in the full map by overlapping the dummy object with one or more of the hidden objects in an event the dummy object is fittable into the partial map.

13. The computer-implemented method according to claim 12, wherein, following the fitting, the full map comprises:
the first objects;
the second objects with the hidden objects; and
the dummy object with additional hidden objects;
where the additional hidden objects represent spaces of the new cell shared with the respective spaces of the one or more second cells respectively associated with the one or more of the hidden objects.

14. The computer-implemented method according to claim 8 further comprising building the cell row such that the space of the full map is disposed adjacent to the second objects with the hidden objects.

15. A computer-implemented method for placing a new non-rectangular cell into a cell row, the method comprising:
generating a full map of the cell row comprising:
first rectangular objects representing rectangular cells of the cell row;
second rectangular objects with hidden rectangular objects representing non-rectangular cells of the cell row and space of the non-rectangular cells shareable with the new non-rectangular cell, respectively; and
space available within the cell row; and
determining whether a rectangular dummy object sized to encompass the non-rectangular cell is fittable into a partial map of the cell row comprising:
the first rectangular objects;
the second rectangular objects without the hidden rectangular objects; and
the space; and
fitting the rectangular dummy object into the space in the full map by overlapping the rectangular dummy object with one of the hidden rectangular objects in an event the rectangular dummy object is fittable into the partial map.

16. The computer-implemented method according to claim 15 further comprising building an updated version of the cell row to comprise the rectangular cells, the non-rectangular cells and the new non-rectangular cell.

17. The computer-implemented method according to claim 15, wherein, following the fitting, the full map comprises:
the first rectangular objects;
the second rectangular objects with the hidden rectangular objects; and
the rectangular dummy object with additional hidden rectangular objects,
the additional hidden rectangular objects representing space of the new non-rectangular cell shared with the space of the non-rectangular cell associated with the one of the hidden rectangular objects.

18. The computer-implemented method according to claim 15, wherein the determining comprises forcing an abutment between the rectangular dummy object and one of the second rectangular objects.

19. The computer-implemented method according to claim 15, wherein the fitting comprises fitting the rectangular dummy object into the space in the full map by overlapping the rectangular dummy object with one or more of the hidden rectangular objects in an event the rectangular dummy object is fittable into the partial map.

20. The computer-implemented method according to claim 19, wherein, following the fitting, the full map comprises:
   the first rectangular objects;
   the second rectangular objects with the hidden rectangular objects; and
   the rectangular dummy object with additional hidden rectangular objects,
   the additional hidden rectangular objects representing spaces of the new non-rectangular cell shared with the respective spaces of the one or more non-rectangular cells respectively associated with the one or more of the hidden rectangular objects.

21. The computer-implemented method according to claim 15 further comprising building the cell row such that the space of the full map is disposed adjacent to the second rectangular objects with the hidden rectangular objects.

* * * * *